United States Patent
Maeuser

(10) Patent No.: US 7,009,156 B2
(45) Date of Patent: Mar. 7, 2006

(54) LAMINATED GLASS PLANE WITH ELECTRICALLY CONTROLLED FUNCTIONAL ELEMENT

(75) Inventor: Helmut Maeuser, Herzogenrath (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/498,358

(22) PCT Filed: Dec. 12, 2002

(86) PCT No.: PCT/FR02/04326

§ 371 (c)(1),
(2), (4) Date: Oct. 29, 2004

(87) PCT Pub. No.: WO03/056880

PCT Pub. Date: Jul. 10, 2003

(65) Prior Publication Data

US 2005/0056638 A1    Mar. 17, 2005

(30) Foreign Application Priority Data

Dec. 24, 2001 (DE) ............................ 101 64 063

(51) Int. Cl.
*H05B 3/00*    (2006.01)
(52) U.S. Cl. ...................................... 219/543; 219/202
(58) Field of Classification Search ............ 219/202, 219/543, 544; 313/506, 513; 210/202–203
See application file for complete search history.

(56) References Cited

U.S. PATENT DOCUMENTS 6,185,812 B1 * 2/2001 Castle et al. .................. 29/611

FOREIGN PATENT DOCUMENTS

| EP | 267 331 | 5/1988 |
| EP | 1 083 613 | 3/2001 |
| JP | 01-189889 | 7/1989 |
| JP | 01-235190 | 9/1989 |

OTHER PUBLICATIONS

Alexey Lachinov, et al., "New effects in electroactive polymers-new basic for sensors", Transducers 95. Eurosensors IX, vol. 2, pp. 198-201 Jun. 25, 1995.

* cited by examiner

*Primary Examiner*—John A. Jeffery
*Assistant Examiner*—Vinod Patel
(74) *Attorney, Agent, or Firm*—Oblon, Spivak, McClelland, Maier & Neustadt, P.C.

(57) ABSTRACT

The invention concerns a laminated glass pane (1) with at least a rigid pane and a flat electrically controlled functional element (2) as well as at least a thin electrically conductive coat (5), wherein, in accordance with the invention, the coat (5) also constitutes a flat electrode of the functional element, the coat being capable of being heated by being powered with an electric voltage, independently of the power supply of the functional element (2). Thus, unwanted variations of the optical properties of the functional elements are reduced when such a laminated glass pane is used at highly fluctuating temperatures, in particular at low temperatures.

14 Claims, 3 Drawing Sheets

LAMINATED GLASS PLANE WITH ELECTRICALLY CONTROLLED FUNCTIONAL ELEMENT

CROSS-REFERENCE TO RELATED APPLICATIONS

The present application is the U.S. counterpart of WO 03/056880, and claims priority to German application number 01/10164063.3 filed on Dec. 24, 2001, the entire contents of each of which are incorporated herein by reference.

BACKGROUND OF THE INVENTION

1. Field of the Invention

The invention relates to a laminated panel assembly comprising at least one rigid panel, an electrically controllable flat functional element, such as an electroluminescent lighting element, and at least one electrically conducting thin film.

2. Description of the Background Art

The term "laminated panel assembly" is understood here to mean a unit consisting of a rigid panel and of the functional element, which is itself composed of several films and joined to the rigid panel, or alternatively applied thereto. The term "functional elements" is understood to mean, within the context of the present description, flat elements such as electroluminescent lighting elements or also panel elements with electrically controllable light transmission, for example elements of the liquid-crystal type. The respective functional element therefore has optical properties that can be electrically controlled.

It is not absolutely necessary to place the functional element between two rigid panels of a laminated panel assembly, but this arrangement will be preferred for safety reasons, given that there is possibly a rather high supply voltage (for electroluminescent lighting elements). Placement in a laminated panel assembly furthermore protects the functional element from mechanical attack and from penetration by moisture and dirt.

The material of the rigid panels may themselves in principle be chosen freely; likewise, it is possible to use plastic panels or glass panels. It is also known that glass panel/plastic panel hybrid laminates can be manufactured on an industrial scale.

Document EP-A1-0 267 331 teaches a laminated panel assembly for vehicles with a sign placed in the adhesive layer of the laminate, which sign is represented or can be back-lit by an electroluminescent (EL) lighting element. The necessary electrical conductors are rendered practically invisible by using transparent conducting tracks or layers inside the laminate. After the supply voltage has been applied, the luminous signal seems to float in the panel assembly without the conductors being visible. The aforementioned document presents two different types of lighting elements. In the first type two conducting electrodes are provided on the same substrate, these being coated by the lighting element, which in turn includes a junction electrode. From the electrical standpoint, two capacitors connected in series are thus formed. In the second type, one of the two electrodes is respectively deposited in the form a thin transparent layer on the two internal surfaces of the laminated panel assembly, and the lighting element is placed between these surfaces. Also disclosed in that document, as an option, is the fact that the output of light through one of the panels may be prevented by means of an opaque coating.

The prior German patent application 10126868.6 discloses a panel with a ruled opaque coating, in which panel, at least in part of the opaque surface portions, at least one flat EL lighting element consists of several layers with a transparent electrode is provided, which lighting element, after an electrical voltage is applied, emits light on the side with the transparent electrode of one of the flat faces of the panel. A laminated panel assembly of this type can be used, for example, as a roof panel in a vehicle, which, when it is dark, illuminates the passenger compartment by internal surface lighting.

For most fields of application of laminated panel assemblies, it is desirable for the luminous tint from the EL lighting element to be practically constant. When such EL lighting elements, made of a thick inorganic film of large area, operate, especially in motor vehicles, it turns out that differences in the color emitted may, however, result when there are variations in temperature. Thus, an EL lighting element at −20° C. will shine with a completely different color than at +80° C., these temperature variations nevertheless being realistic during the use of a motor vehicle. A given luminous tint, whose color harmonizes, for example, with its surroundings, can only be set for a certain limited temperature range.

The abovementioned literature does not tackle this problem. Admittedly, these lighting elements in operation gives off a certain amount of heat because of the power that they dissipate; however, in practice this is negligible.

Trials carried out for the purpose of balancing the luminous tint by injection of the frequency of the supply voltage result in a drastic reduction in the lifetime of the EL lighting element.

It is certainly possible, by using a temperature sensor, to completely prevent the EL lighting element from lighting at low temperatures. Thus, negative effects of low-temperature operation on the lifetime of the EL lighting element are also avoided.

SUMMARY

The basic principles of electroluminescence have been known for a long time. A detailed document and the luminous tints that can be achieved may be obtained from the Internet address "http://dupont.com/mcm/luxprint/about.html" (situation: December 2001), so that it is necessary to go into details here only briefly.

A capacitor is produced from two conducting layers, one of which is transparent and lets light through. Deposited on the transparent electrode, in the capacitor, is an opaque layer with light-emitting pigments and an insulating (dielectric) layer. If an AC voltage (usually 100 V AC) is applied to the two electrodes of this element, this voltage induces currents in the pigments, which in turn produce, by dispersion processes, light that leads through the transparent electrode.

The electrode layers, the electroluminescent layer itself and the dielectric layer may be deposited by thick film screen printing on suitable substrates, such as glass or PET sheets. This known effect produces surface lighting effects which can be used for many purposes (lighting, logos, luminous signs), if the relatively low light density and the choice of colors, limited by the materials that can be used, are acceptable. Furthermore, the electroluminescent elements themselves (hereafter called lighting elements) are not transparent so that a surface provided with them cannot let light through (in daylight).

Electrically controllable panel elements are also known which work on the basis of liquid crystals, the light transmission of which may be modified by applying a voltage. These elements may also introduce undesirable variations in the instantaneous degree of transmission at extreme temperatures. Thus, such a panel element may, in the off state, in which it should in fact remain opaque, spontaneously becomes transparent at temperatures below −5° C.

It is known from many reports that thin transparent conducting films of doped oxides or of metals can be used as panel surface heating. For this purpose, it is necessary to conduct, via suitable power supplies or electrodes, a current over the area of the film, which because of its ohmic resistance heats up. As a general rule, such films constitute one part of a multilayer system composed of several thin films, this being most of the time transparent to visible light, which may also have thermal insulation or reflection properties. The thin films are films deposited by a process other than screen printing. It is also known to use controls that act automatically with sensors, whereby a panel (of a vehicle) is automatically heated, for example in order to remove fogging on the inside of this panel.

The object of the invention is to reduce the temperature-induced variations in the properties of an electrically controllable functional element placed on or in a laminated panel assembly.

In accordance with the invention, this objective is achieved by the fact that the film forms at the same time a flat electrode of the functional element, this film being able to be supplied with an electrical voltage and heated independently of the power supply for the functional element.

The features of the secondary claims represent advantageous improvements of this subject matter. A method for using a functional element combined with a laminated panel assembly is also disclosed.

Thus, the functional element is coupled to a surplus heating film which makes it possible, in all cases at low ambient temperatures, to increase the temperature of the functional element up to the range in which its optical properties, for example the tint of the light emitted, were designed.

In a preferred variant, the power, or current, supplied to the heating film is automatically controlled by means of a temperature sensor. For a temperature value measured by the temperature sensor below a predetermined threshold, the functional element is heated until the measured temperature lies within the desired or defined range.

The system can work with a measurement of the ambient or external temperature, or else the temperature inside the passenger compartment of a vehicle as the measurement quantity. However, it will be preferable to place the temperature sensor as close as possible to the functional element, for example by integrating it into the laminated panel assembly, so as to obtain as sensitive as possible a response of the temperature control to the actual temperature of the functional element.

In principle, the laminated panel assembly may be provided with a separate transparent heating film, which is not functionally coupled to the functional element. However, it is particularly advantageous to also use, for the possible heating, one of the electrode films that it is in any case necessary to provide for the functional element. The electrical supply for the heating function may be provided using a DC voltage, which is applied to two electrodes on each side of the functional element. For uniform coupling of the voltage potential within the transparent electrode (ITO film), a broad conducting track is in any case required. Consequently, only one further electrode is required, the position of which must be chosen in accordance with the heating voltage chosen. To obtain sufficient heating power for low supply voltages (for example a DC voltage of 12 V, the busbar distance must be short, in any case less than the width.

The current flowing between the two electrodes heats the film and the functional element attached to the surface of said film; however, it does not affect the power supply (AC voltage) for the functional element.

In principle, it matters little in this case whether the functional element is placed or printed directly on one face of a rigid panel or is manufactured on a particular support such as, for example, a sheet of PET, which will subsequently be suitably joined to the rigid panel or laminated into a composite. In both configurations, the heating film may either be placed between the rigid panel, or the supporting sheet, and the functional element or be placed on the opposite side of the functional element from the panel or the supporting sheet.

In addition to the positive effect on the properties of the functional element, in particular the better color constancy of an EL lighting element, this heating film furthermore allows the thermal comfort in a vehicle to be improved, specifically when the laminated panel assembly is placed in the roof region.

The ratio of the area of the functional element to the total area of the panel can also be chosen freely. If required, several functional or lighting elements with possibly different colors and shapes may be placed together side by side.

Finally, it may also be beneficial, for particular applications, to emit light from one or more electroluminescent lighting elements on both plane faces of the panel assembly. In this case, a separate opaque coating is unnecessary because the electroluminescent layers themselves do not let visible light through. In principle, it is also possible to "stack" several electroluminescent lighting elements of this kind, one on top of another, possibly with orientations differing from one another, for which a common intermediate electrode may optionally be employed. This intermediate electrode may again also serve as heating film in accordance with the invention.

DETAILED DESCRIPTION

Further details and advantages of the subject matter of the invention will become apparent from the drawings of illustrative examples and from the detailed description which follows. The description is given with reference to an EL lighting element, without however wishing to thus exclude other functional elements for this application.

Figure 1:
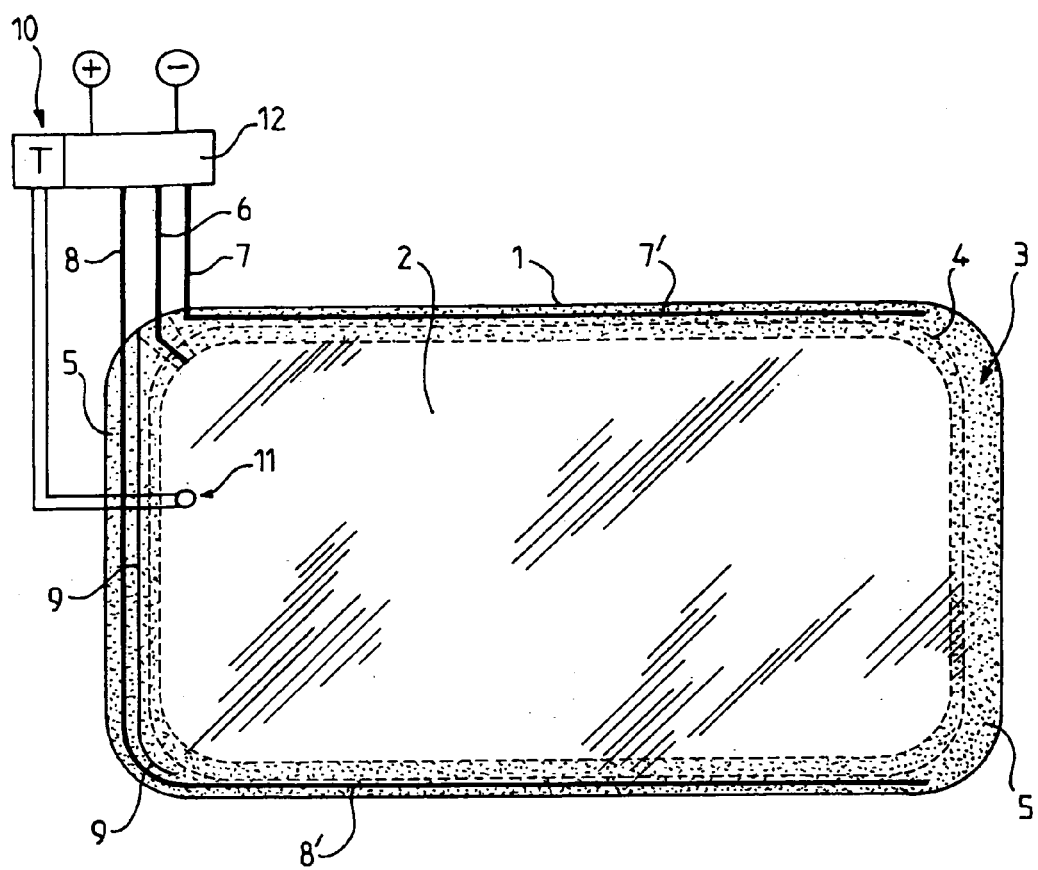
FIG. 1 shows a front view of a panel assembly with an EL lighting element and electrical heating coating.

FIG. 1 shows, in a simplified representation and as an example, a view of a panel assembly with an EL lighting element and an electrical heating coating.

A rigid panel 1 supports an EL lighting element 2, which extends over practically the entire area of the surface of the panel 1, but which leaves a peripheral edge region 3 of the panel free. A dotted line 4 denotes the boundary of an external edge strip on the face of the panel, which may be covered by an opaque colored film which serves as visual protection. Of course, this boundary may also lie within that area of the surface of the panel 1 which is covered by the EL lighting element 2; said boundary has been shown here outside this surface region only for the sake of clarity.

Placed under the EL lighting element 2 is an electrically conducting, preferably transparent, film 5 which extends over the entire area of the panel 1 and also covers the edge strip rendered opaque. A distance of a few millimeters between this film 5 and the edge of the panel will also be maintained—in a manner known per se—so as to prevent corrosion. As a general rule, the film 5 forms part of a multilayer system, the color and reflection properties of which can be adjusted over a wide range according to the requirements by a targeted definition of the thicknesses and materials of the individual layers. However, for the function described here, it is essentially only the electrical conductivity and the heating capability of at least one of the individual layers that are important. The film 5 may, for example, be composed of indium tin oxide (ITO), but also of a metal, for example silver.

This film 5 forms one of the flat electrodes of the EL lighting element 2 constructed overall as a capacitor, preferably the ground electrode. If light from the lighting element has to be emitted through this electrode, it must of course be transparent to visible light. The electrical supply (AC voltage) for the other side of the EL lighting element 2 is indicated by a lead 6, which is insulated from the film 5 and is connected, in a manner not shown in detail, to the second flat electrode of the EL lighting element 2. The lead 6 is connected, in a manner not shown, to another flat electrode on one side of the EL lighting element 2, in this case at the top.

Two other leads 7 and 8 serve to supply the film 5 with a supply voltage (DC voltage). All the leads are placed in a corner region of the panel 1. The leads 7 and 8 are connected electrically to conducting tracks 7' and 8'. The conducting track 7' extends from the corner of the panel along the long lateral upper side of the panel (as in the drawing) as far as a point close to the following corner of the panel. The conducting track 8' firstly runs along a short side of the panel 1, describes a tight arc around a corner of the panel and then extends along the lower lateral side of the panel as far as a point close to the following corner.

The conducting tracks 7' and 8' (in conventional panel heating systems, the tracks are also called collector rails) may be produced in the form of thin bands which are suitably fixed to the panel. However, they may also be applied to a rigid panel by screen printing a conductive printing paste and then baked, for example when bending and/or toughening a glass panel. In all cases, they are electrically connected over a large area to the electrically conducting film 5 and may lie either above or below the film 5. If necessary, the film could even be contained between two conducting tracks deposited one after the other (one before the film is applied and the other afterwards). Furthermore, the conducting tracks 7' and 8' are placed in such a way that they contain, between them, the surface of the film 5 covered with the EL lighting element 2. Likewise, they are placed in a manner concealed from sight in that edge region of the panel 1 rendered opaque. Of course, another visual mask may also be provided on the other side of the panel that can be seen here.

By means of a separating line 9 made in the film 5 parallel to the short side, the conducting track 8' is separated from the rest of the field of the film with a high ohmic resistance. This measure is necessary because, or when, the two leads 7 and 8 are relatively close to one another. Admittedly it is thus simpler for electrically contacting them with the outside (for example it is possible to use an assembly common to several pins or by cross connection), however, without the separating line 9 the heating current would flow along the shortest path, and therefore in practice directly between the leads 7 and 8 through the film 5.

If necessary, such separating lines may also provided for electrically insulating the lead 6 from the film 5, in the region where it covers the film 5. One possible embodiment with two separating lines, on each side of the lead, is indicated by the dot-dash lines in the figure.

The configuration illustrated here, of conducting tracks and leads, ensures that, by applying a DC voltage to the leads 7 and 8 and to those two portions of the conducting tracks 7' and 8' running horizontally (in the drawing), a current flows which is uniformly distributed over the area of the conducting film 5. The film 5 serves in this case as the ground electrode for the EL lighting element 2. One of the conducting tracks, 7' or 8', forms the common point for collecting the outgoing current, both for the EL lighting element 2 and for heating the film.

The electrical resistance of the film (typical surface resistances of such films lie between 2 and 4 $\Omega$/square) results in heating when a current flows. The heating power produced is used for the targeted adjustment of the temperature of the EL lighting element 2. For this purpose, a temperature control 10 is provided, which determines the actual temperature of the EL lighting element 2 with (at least) a temperature sensor 11 (for example a PTC element to be laid flat) directly in or on the laminated panel assembly 1. It forms part of a centralized control 12, shown only schematically, which is in turn connected to a power supply for the power and measurement/control currents and which manages all the electrical functions of the panel 1, in particular also the electrical supply for the EL lighting element 2. If the panel is an electrically operated moving panel (roof panel) in a vehicle, the centralized control may then also include the control for its position. The temperature control 10 comprises in any case the structural and switching elements that are needed to adjust a setpoint temperature in the region of the temperature sensor 11. In particular, it will automatically apply the supply voltage needed for the leads 7 and 8 when the temperature sensor indicates that the actual temperature is below a predetermined value, and it will cut off the supply voltage when a predetermined setpoint temperature is again reached.

Where appropriate, this may also occur when the vehicle is at rest, when any undesirable transparency of a panel element with electrically controllable light transmission must be prevented.

Of course, any thermal damage to the EL lighting element 2 due to the heating is excluded by limiting the heating power, or alternatively the maximum temperature that can be achieved. Even if the heating of the panel 1 by means of the film 5 has to be able to be triggered in another way, in particular manually, any additional heating must then be prevented by means of the temperature sensor 11 when further heating, in an already hot environment, would run the risk of thermally damaging the EL lighting element 2.

Finally, the temperature control, or alternatively the centralized control, may be configured in such a way that the EL lighting element 2 can be switched on only when the temperature lies within a range that does not prejudice its operation. This means that its operation could also be prevented, for example, even in the case of extreme ambient temperatures.

Figure 2:
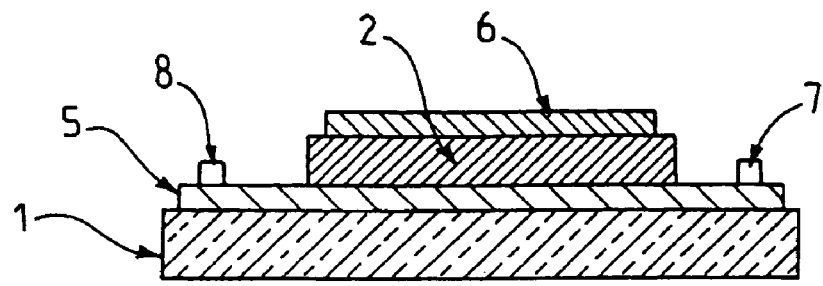
FIG. 2 shows a sectional view of the device shown in FIG. 1.

FIG. 2 shows a cross-sectional view of the rigid panel 1 connected to the thin film 5 which is in turn connected to the functional layer (EL lighting element) 2. The electrode 6 is positioned in contact with the functional layer 2. The leads 7 and 8 also are shown contacting the thin film 5.

Figure 3:
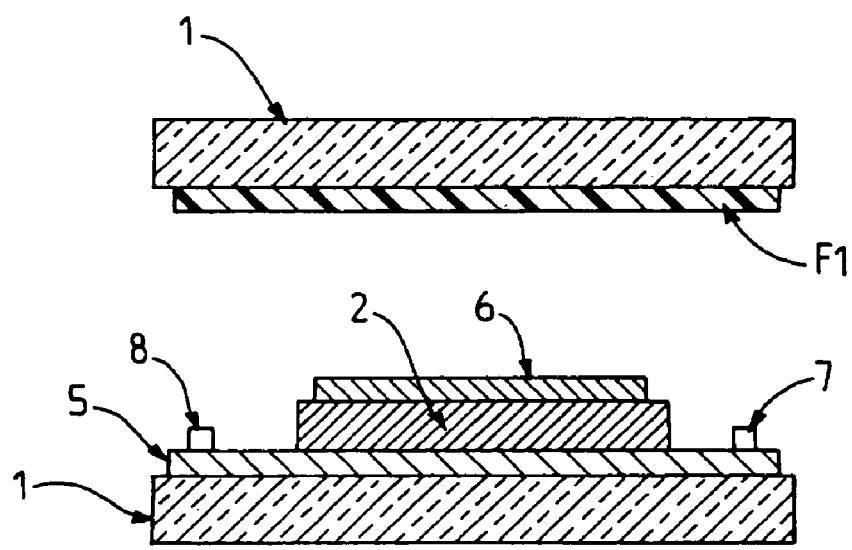
FIG. 3 shows the device of FIG. 2 with two rigid panels joined by an interlayer, in which assembly a functional element and thin film are housed within the interlayer.

FIG. 3 shows two rigid panels 1 joined by an interlayer F1, in which assembly a functional element 2 and thin film 5 are housed within the interlayer.

Figure 4:
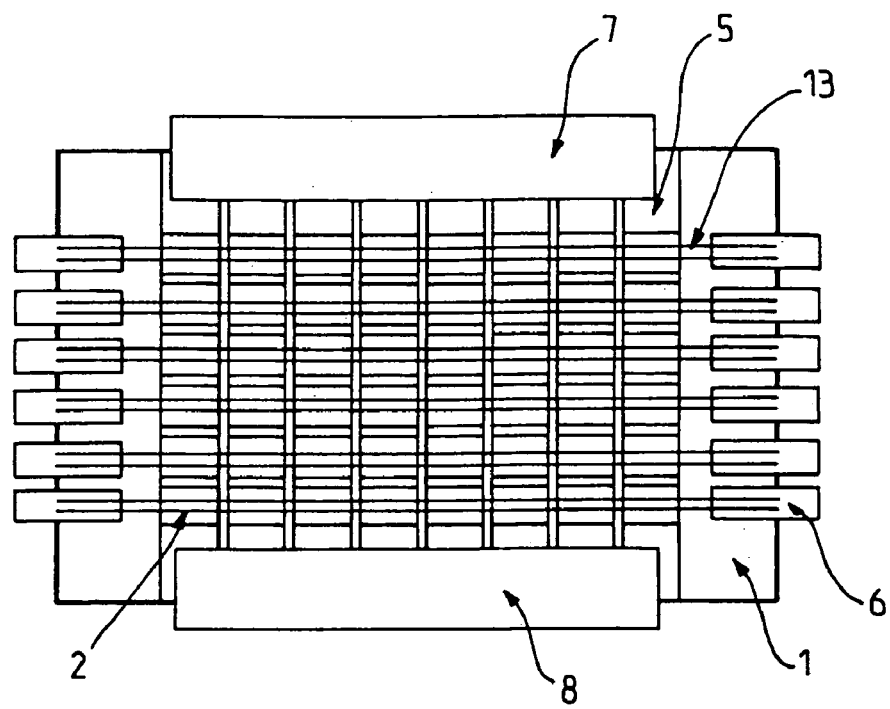
FIG. 4 shows a device with multiple functional elements provided side by side.

FIG. 4 shows plural functional elements provided, side by side, to be operated independently of one another, which include a common electrode (shown here as thin film 5). A network of wires 13 or equivalent dispatch power to each functional element from the electrode 6. The leads 7 and 8 are shown connected to the thin film 5.

Figure 5:
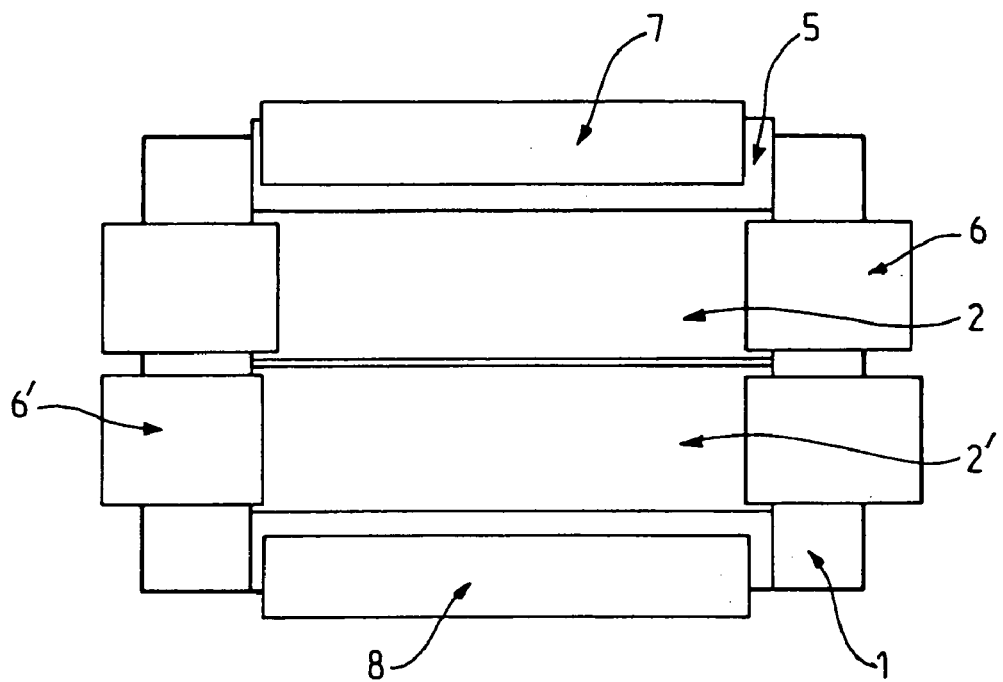
FIG. 5 shows a device with multiple electro luminescent lighting elements provided one on top of another.

FIG. 5 shows a laminated panel assembly with two electroluminescent lighting elements 2 and 2' provided, one on top of another, to be operated independently of one another, but including a common central electrode 5. The electroluminescent lighting elements 2 and 2' are connected to the electrodes 6 and 6', respectively.

What is claimed is:

1. A laminated panel assembly comprising:
   at least one rigid panel;
   an electrically controllable flat functional element; and
   at least one electrically conducting thin film that forms a flat electrode of the functional element, the thin film being connected to receive an electrical voltage that heats the thin film independently of a power supply for the functional element.

2. The laminated panel assembly as claimed in claim 1, wherein the thin film is configured to be supplied automatically with the electrical voltage according to a temperature signal sent to a temperature control from a temperature sensor.

3. The laminated panel assembly as claimed in claim 2, wherein the temperature sensor is combined in a space with the functional element and determines an actual temperature of the functional element.

4. The laminated panel assembly as claimed in claim 1, wherein the functional element covers at least part of a surface of the thin film.

5. The laminated panel assembly as claimed in claim 1, wherein the thin film is in electrically conducting contact with at least two conducting tracks configured to deliver a supply voltage for heating of the functional element, which tracks are placed on either side of the functional element covering the thin film.

6. The laminated panel assembly as claimed in claim 1, wherein the functional element is mounted directly on the rigid panel.

7. The laminated panel assembly as claimed in claim 1, wherein the functional element is mounted on a specific supporting substrate.

8. The laminated panel assembly as claimed in claim 1, comprising at least two rigid panels and an interlayer joining the at least two rigid panels together, in which assembly the functional element and the thin film are housed within the interlayer or are placed on an internal face of one of the at least two rigid panels.

9. The laminated panel assembly as claimed in claim 1, wherein plural functional elements are provided, side by side, to be operated independently of one another, which include a common electrode.

10. The laminated panel assembly as claimed in claim 1, wherein at least two electroluminescent lighting elements are provided, one on top of another, to be operated independently of one another, which include a common central electrode.

11. The laminated glazing panel as claimed in claim 10, wherein the common central electrode is configured to be used as heating film.

12. A method for using a functional element having electrically controllable properties, combined with a laminated panel assembly, in which the laminated panel assembly comprises at least one rigid panel and at least one electrically conducting film, wherein the electrically conducting film is connected to receive an electrical voltage that heats the thin film independently of a power supply for the functional element, when an actual temperature of the functional element, determined by a temperature sensor, is below a predetermined setpoint temperature.

13. The method as claimed in claim 12, wherein the power supply for the functional element is configured to be operated only if the setpoint temperature of the functional element is set.

14. The method as claimed in claim 12, wherein a flat electrode of the functional element is supplied with the electrical voltage and heated.

* * * * *